United States Patent [19]
Ketcham

[11] Patent Number: 4,925,217
[45] Date of Patent: May 15, 1990

[54] QUICK CONNECTOR WITH VISUAL CHECKING METHOD

[75] Inventor: Mark G. Ketcham, Marine City, Mich.

[73] Assignee: Huron Products Corporation, Mt. Clemens, Mich.

[21] Appl. No.: 261,684

[22] Filed: Oct. 24, 1988

[51] Int. Cl.$^5$ .............................................. F16L 35/00
[52] U.S. Cl. ........................................ 285/93; 285/319
[58] Field of Search .......................... 285/93, 314, 340; 439/488, 489; 403/27; 411/10, 11, 13, 14, 544

[56] References Cited

U.S. PATENT DOCUMENTS

| | | |
|---|---|---|
| 2,661,768 | 12/1953 | Novak et al. |
| 3,468,563 | 9/1969 | Duret . |
| 3,480,300 | 11/1969 | Jeffrey et al. |
| 3,526,417 | 4/1968 | Aumiller . |
| 3,881,392 | 5/1975 | Curtis .................................. 411/11 |
| 4,046,387 | 9/1977 | Lee . |
| 4,131,050 | 12/1978 | Holmes ................................. 411/10 |
| 4,258,943 | 3/1981 | Vogt et al. ........................... 285/340 |
| 4,293,257 | 10/1981 | Peterson .............................. 411/11 |
| 4,572,552 | 2/1986 | Orevik et al. |
| 4,575,130 | 3/1986 | Pemberton et al. |
| 4,614,120 | 9/1986 | Fradin et al. |
| 4,618,171 | 10/1986 | Fahl . |
| 4,659,119 | 4/1987 | Reimert . |
| 4,703,957 | 11/1987 | Blenkush . |
| 4,712,810 | 12/1987 | Pozzi . |

FOREIGN PATENT DOCUMENTS

| | | |
|---|---|---|
| 22568 | 6/1948 | Finland . |
| 1544720 | 9/1968 | France . |
| 84/03927 | 10/1984 | PCT Int'l Appl. |
| 215389 | 9/1941 | Switzerland . |
| 966842 | 8/1964 | United Kingdom . |

OTHER PUBLICATIONS

IBM Technical Disclosure Bulletin, vol. 17, No. 7, Dec. 1974.

Primary Examiner—Dave W. Arola
Attorney, Agent, or Firm—Harness, Dickey & Pierce

[57] ABSTRACT

A conduit assembly has a visual inspection device. The visual inspection device is positioned within a connector housing. The device enables inspection of the connector to determine if proper connection between the housing and conduit has been achieved. The inspection device includes an annular member which, when in a vaulted position, exposes flags to indicate one position of the annular member to a substantially flat position concealing the flags to indicate a second position of the annular member.

12 Claims, 1 Drawing Sheet

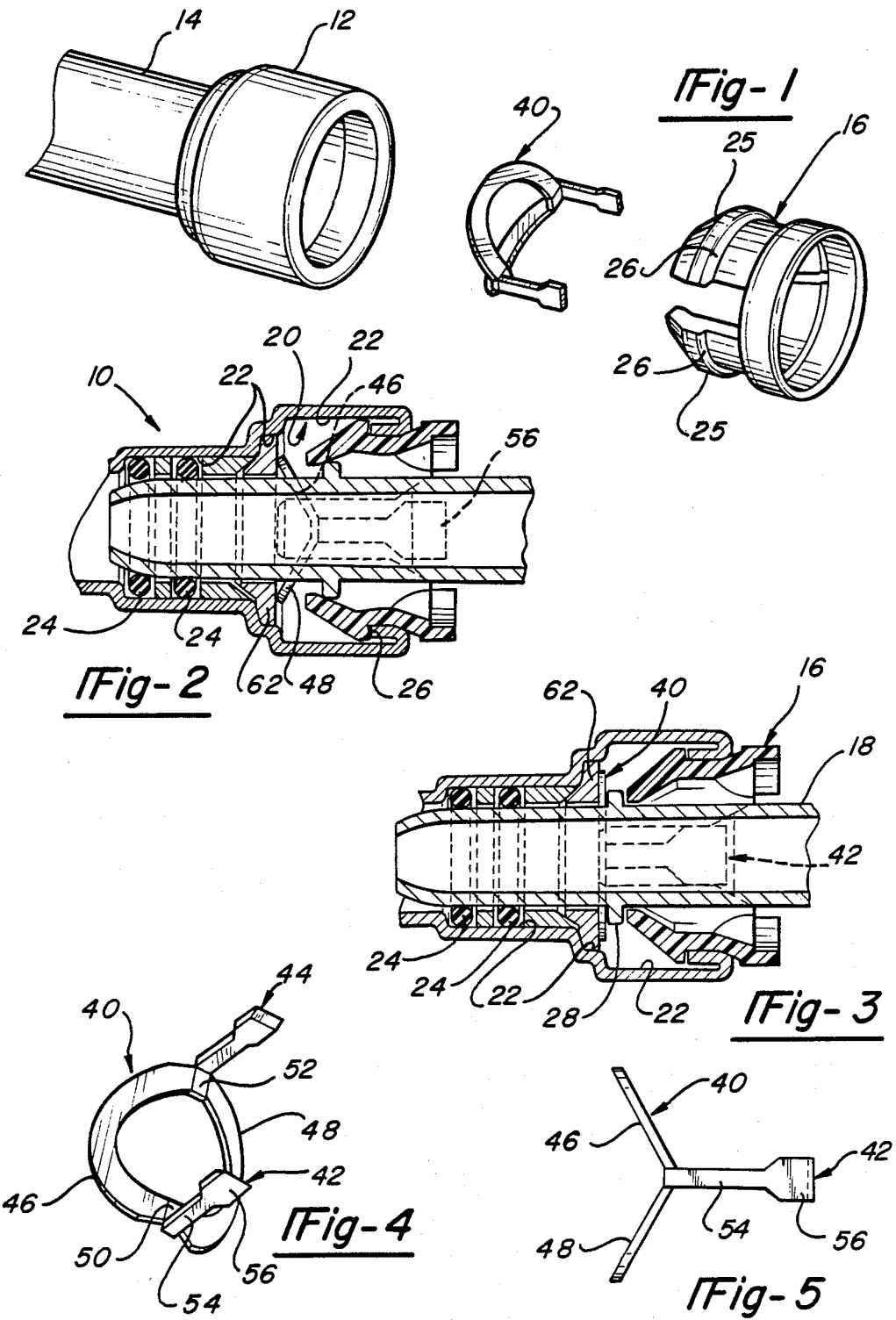

QUICK CONNECTOR WITH VISUAL CHECKING METHOD

BACKGROUND AND SUMMARY OF THE INVENTION

The present invention relates to quick connectors and, more particularly, to quick connectors having a device to enable visual inspection to determine proper coupling of the male and female portions of the connector.

It is desirous in fluid-handling conduits to ensure that the connectors used have their male and female portions properly coupled together. A faulty connector enables the system to leak. This is particularly fatal when the system is under pressure and the leaking connector expels the pressurized fluid.

In the quick connector field, where the male and female portions of the connectors are held together by friction blocking connections, it is important that the male and female portions are properly coupled. To ensure the proper coupling, the installer may tug on or manipulate the connector to make sure that it is properly coupled. Also, visual types of inspecting devices enable the installer to ensure that the male and female portions are properly coupled together.

The following patents illustrate several different types of connection inspection devices. The patents and articles are as follows: U.S. Pat. Nos. 4,712,810, issued Dec. 15, 1987 to Pozzi; 4,703,957, issued Nov. 3, 1987 to Blenkush; 4,659,119, issued Apr. 21, 1987 to Reimert; 4,618,171, issued Oct. 21, 1986 to Fahl; 4,614,120, issued Sept. 30, 1986 to Fradin et al; 4,575,130, issued Mar. 11, 1986 to Pemberton et al; 4,572,552, issued Feb. 25, 1986 to Orevik et al; 4,046,387, issued Sept. 6, 1977 to Lee; 3,526,417, issued Sept. 1, 1970 to Aumiller; 3,480,300, issued Nov. 25, 1969 to Jeffery et al; 3,468,563, issued Sept. 23, 1969 to Duret; 2,661,768, issued Dec. 8, 1953 to Novak et al; International Patent No. WO 84/03927; Finland Patent No. 22,568; French Patent No. 1,544,720; Great Britain Patent No. 966,842; Swiss Patent No. 215,389; and IBM Technical Disclosure Bulletins, Volume 1, No. 4, Dec. 1958, p. 15 and Volume 17, No. 7, Dec. 1974, p. 1948. While these types of connectors may work satisfactory for their intended purpose, designers are always striving to improve the field.

Accordingly, it is an object of the present invention to provide a visual inspection device which enables, at a glance, the installer to ensure proper connection of the connector. Also, the present invention provides the art with a simple, inexpensive visual inspection device.

From the subsequent detailed description taken in conjunction with the appended claims and drawings, other objects and advantages of the present invention will become apparent to those skilled in the art.

BRIEF DESCRIPTION OF THE DRAWINGS

FIG. 1 is a perspective exploded view of a conduit connector assembly embodying the present invention.

FIG. 2 is a vertical partial cross-section view of FIG. 1 in a noncoupled position.

FIG. 3 is a vertical partial cross-section view in a coupled position similar to FIG. 2.

FIG. 4 is a perspective view of the inspection device in accordance with the present invention.

FIG. 5 is a side view of an inspection device in accordance with the present invention.

DETAILED DESCRIPTION OF THE PREFERRED EMBODIMENT

Turning to the figures, a quick connector assembly is illustrated and designated with the reference numeral 10. The assembly 10 includes a housing 12 connected to a conduit 14, a retainer 16 and a conduit 18.

As seen in FIG. 2, the housing 12 generally includes a central bore 20 having one or more step portions 22 therein. Elements, such as O-rings 24 or the like, may be positioned in the interior of the housing along one of the stepped portions for sealing the conduit 18.

The retainer 16 is generally an annular member having one or more extending fingers 25. The fingers 25 have abutment portions 26 for locking the retainer 16 within the housing 12. The fingers 25 are resilient and enable the conduit 18 to pass therethrough. Generally, the conduit 18 has an annular bead 28 with a diameter larger than that of the conduit 18. The bead 28 abuts against the fingers 25 to retain the conduit 18 within the housing 12.

The inspection device generally includes an annular member 40 with extending members 42 and 44. The annular member 40 is formed from a resilient material and is deformable from a first position to a second position. Generally, the annular member 40 includes a pair of arcuate half circle legs 46 and 48. The arcuate legs 46 and 48 are separated by a pair of flat portions 50 and 52. As can be seen in FIG. 2, the annular ring member 40 is generally vaulted in a relaxed position. The members 42 and 44 generally include an elongated neck portion 54 and a flag or head portion 56. The elongated portion 54 is integral with the flat portions 50 and 52 of the annular member 40.

As can be seen in FIGS. 1 through 3, the inspection device is placed within the housing 12. The legs 46 and 48 of the annular member 40 abut a bushing 62 within the housing 12. When first positioned within the housing 12, the inspection device is in its vaulted position, as seen in FIG. 2. As the conduit 18 is passed through the opening within the annular member 40, the bead 28 first abuts the flat portions 50 and 52 of the annular member 40. The conduit is further driven into the housing 12 until the legs 46 and 48 of the annular member 40 become coplanar with the flat portions 50 and 52 to form a substantially flat ring, as seen in FIG. 3.

The elongated members 42 and 44 extend a desired distance out of the housing 12, when in the vaulted position, so that the members 42 and 44 may easily be visually inspected when the conduit 18 is not locked in the housing 12 by the retainer 16, as seen in FIG. 2. As the annular bead 28 abuts the annular member 40 and is driven into a locked position with the retainer 16, the elongated members 42 and 44 are drawn within the housing 12 such that they are not visible to the installer. Also, the members could be longer such that the members 42 and 44 are visible by the installer to indicate both the coupled and uncoupled relationship of the retainer 16 with the annular bead 28 of the conduit 18. Thus, the elements 42 and 44 are easily viewed when the conduit 18 is not properly coupled in the retainer 16 in the housing 12. This provides for visual inspection of the connector 10 to ensure that the conduit 18 is securely and properly fastened within the housing 12.

While the above describes the preferred embodiment of the present invention, it will be understood that the invention is susceptible to modifications, variations and alterations without deviating from the scope and fair meaning of the subjoined claims.

What is claimed is:

1. A visual inspection device for quick connectors comprising:
    annular means adapted for positioning about a conduit within a connector housing such that in a first position said annular member being substantially vaulted and in a second position said annular member being substantially flat; and
    means for indicating the position of said annular means, said indicating means being visible to an observer when said annular member is in its first vaulted position and moving to a second position when said annular member is in its second position wherein said indicating means visually indicates to the observer that the conduit is securely coupled within the connector housing.

2. The visual inspection device according to claim 1 wherein said annular means includes at least one deformable portion for enabling said annular means to move between said first and second position.

3. The visual inspection device according to claim 1 wherein said annular means is formed from a resilient material.

4. The visual inspection device according to claim 1 wherein said indicating means includes at least one elongated member extending from said annular means and a flag associated with each elongated member for enabling visual inspection by an observer of the flag for determining the position of the annular means.

5. A quick connector assembly comprising:
    a housing having a central bore therethrough;
    a conduit adapted to be coupled with said housing;
    means for retaining said conduit with said housing;
    means for enabling visual inspection of the coupling of said conduit with said housing, said visual inspection means comprised of annular means adapted for positioning about said conduit, said annular means positioned within said housing such that in a first position, wherein said conduit is not retained in said housing, said annular means being substantially vaulted and in a second position, wherein said conduit is retained in said housing, said annular means being substantially flat; and
    means for indicating the position of said annular means, said indicating means being visible to an observer when said annular member is in its first vaulted position and moving to a second position when said annular member is in its second position wherein said indicating means visually indicates to the observer that said conduit is retained in said connector housing.

6. The visual inspection device according to claim 5 wherein said annular means includes at least one deformable portion for enabling said annular means to move between said first and second position.

7. The visual inspection device according to claim 5 wherein said annular means is formed from a resilient material.

8. The visual inspection device according to claim 5 wherein said indicating means includes at least one elongated member extending from said annular means and a flag associated with each elongated member for enabling visual inspection by an observer of the flag for determining the position of the annular means.

9. A visual inspection device for quick connectors comprising:
    an annular element having at least one deflectable portion and one rigid portion, said at least one deflectable portion continuous with and extending from said at least one rigid portion forming said annular element such that said annular element is vaulted in a relaxed position and said annular element is adapted to become substantially flat in an activated position; and
    means for indicating the position of said annular element, said indicating means being visible to an observer when said annular member is in its first vaulted position and moving to a second position when said annular member is in its second position wherein said indicating means visually indicates to the observer that the conduit is securely coupled with the connector housing.

10. The visual inspection device for quick connectors according to claim 9 wherein said annular element includes a pair of resilient arcuate legs enabling movement between said first and second position.

11. The visual inspection device for quick connectors according to claim 9 wherein said annular element includes a pair of flat rigid members having said pair of arcuate legs extending therefrom.

12. The visual inspection device for quick connectors according to claim 11 wherein said indicating means includes a pair of elongated members extending from said flat members substantially perpendicular thereto and a flag on each of said elongated members for providing visual inspection of the position of said annular element.

* * * * *